Inventor
Henry MEGard
by: J Delattre Seguy
Attorney

Dec. 23, 1958

H. MÉGARD 2,865,987

MEANS FOR CHANGING THE FREQUENCY IN COMBINED WIRELESS AND TELEVISION SETS

Filed Oct. 13, 1954

2 Sheets-Sheet 2

Inventor:
Henry Mégard
by: J. Delattre-Seguy
Attorney

United States Patent Office 2,865,987

Patented Dec. 23, 1958

2,865,987

MEANS FOR CHANGING THE FREQUENCY IN COMBINED WIRELESS AND TELEVISION SETS

Henry Mégard, Geneva, Switzerland, assignor to Sautier & Jaeger, Geneva, Switzerland, a Swiss firm Application October 13, 1954, Serial No. 462,069

Claims priority, application Switzerland October 16, 1953

8 Claims. (Cl. 178—5.8)

My invention has for its object means for providing a heterodyning of the broadcast radio and television frequencies in a set adapted to receive both broadcast radio and television waves, said heterodyning being performed through the fundamental wave and the second harmonic of a single local oscillator. Hitherto, such heterodyning steps were performed exclusively in broadcast wireless sets while the intensity of the second harmonic component was too low to allow its use for the proper heterodyning of incoming television waves. My invention provides for a considerable rise in the level of the second harmonic, so that it may serve for the heterodyning both of broadcast radio and television waves. The fundamental frequency may serve for instance for heterodyning broadcast radio frequencies in the low, medium and high frequency bands while the second harmonic serves for heterodyning the band of frequencies ranging between 41 and 68 megacycles used for television frequencies or again for the heterodyning of intermediate frequencies ranging between 82 and 136 megacycles.

Heterodyning is a well-known method consisting in producing upper and lower beats between the local oscillator or its harmonics and the high frequencies to be converted. Such a heterodyning method does not show any drawbacks in the case of its application to wireless sets when the amplitude of oscillation is sufficient to reach a value at least equal to the biasing of the electrode receiving the high frequency, divided by $\sqrt{2}$.

However, when it is desired to use, in addition to the fundamental wave, a multiple thereof for the desired conversion, the harmonic voltages available are not sufficient for the obtention of the optimum result.

On the other hand, in certain particular cases of use of the fundamental wavelength, chiefly in the case where the oscillation is injected on the same control grid as the incoming frequency, there may be a risk of the local frequency being shifted by the circuit carrying the incoming frequency. This risk is all the greater when it is necessary to cover a continuous range of frequencies.

In order to obtain a rational use of such arrangements, it is, therefore, necessary to bring the multiple harmonics to be used substantially to the same level as the fundamental frequency and to provide an optimum separation between the oscillating and mixing circuits.

My invention has for its object to design means for satisfying such conditions. To this end, I provide for the change of frequency in a combined wireless and television set, according to a method which produces a heterodyning through upper or lower beats and multiplication of frequency between a local oscillation and the incoming signal the frequency of which is to be converted, this being obtained by resorting to a frequency transformer and mixer with a view to producing the intermediate frequency for the audio and video signals used in television sets.

According to a further object of my invention, there is inserted between the local oscillator and the mixer an aperiodic buffer stage including an electronic tube of which the main electrodes, to wit the cathode, the control grid and the anode, are designed and biased so as to multiply the fundamental frequency of the local oscillation.

My invention includes, furthermore, an arrangement for producing a change of frequency for the execution of the above described method. Said arrangement is intended for a combined wireless and television receiving set including a high frequency wireless chain, leading to two thermionic oscillating and modulating tubes of which the modulating grids are energized by the oscillations fed by a local electronic oscillator tube system and it is characterized by the fact that the anode of such a local oscillating tube is connected with the first control grid of at least one separate buffer tube including a first group of electrodes adjusted so as to double the frequency of the local oscillations and a second group of electrodes, the control grid in which is coupled with the anode of the first group and is fed, on the other hand, by the amplified incoming signals transmitted by a high frequency stage of a chain reserved for television purposes or otherwise, whereby this second group of electrodes serves as a mixer located ahead of an intermediate frequency television chain.

I have illustrated by way of example in accompanying drawings two preferred embodiments of an arrangement according to my invention. In said drawings.

Figure 1:
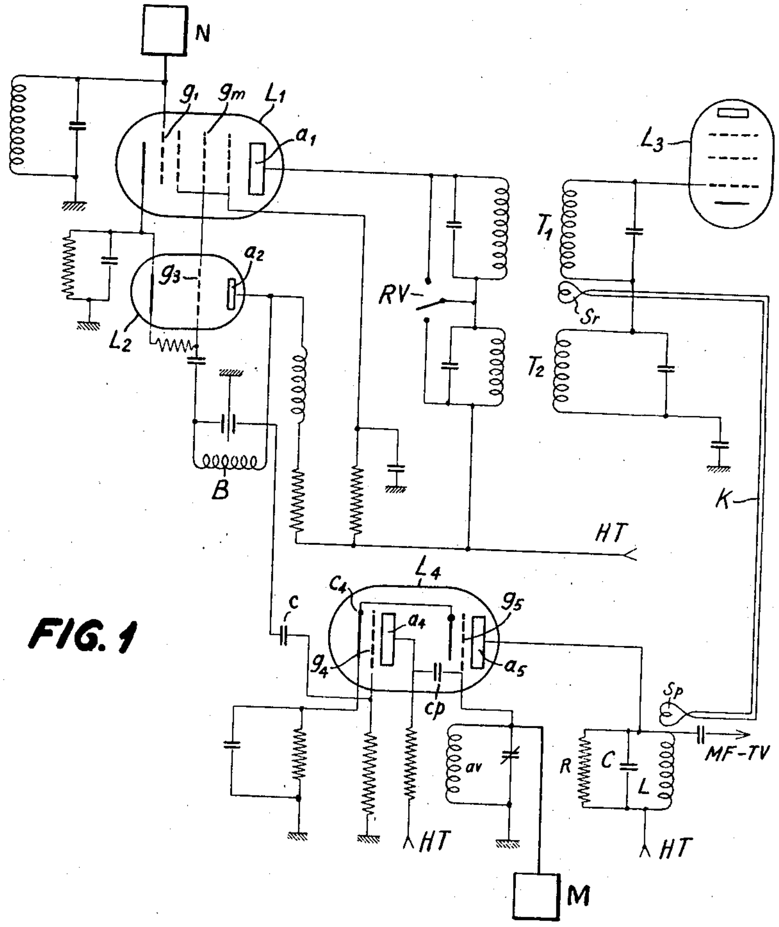
Fig. 1 is a wiring diagram of the connections of a first embodiment.

In the example illustrated in Fig. 1, the high frequency radio signals transmitted by a broadcasting station are applied after amplification to the control grid *g*–1 of a tube L–1 forming an oscillating and modulating tube, the modulating grid *gm* of which is connected with the control grid *g*–3 of a triode L–2 forming part of a local oscillator. The anode *a*–1 of the oscillating and modulating tube L–1 is connected with the primaries of the connecting transformers T–1 and T–2 which are tuned to corresponding frequencies equal respectively to 27 megacycles and 473 kilocycles; the secondaries of said transformers feed the first tube L–3 of a chain of amplifying stages at intermediate frequencies of 27 megacycles and 473 kilocycles which serve for the transmission to the loudspeaker of the broadcast sounds or of the sounds accompanying the television pictures. Said frequencies of 27 megacycles and 473 kilocycles correspond in fact respectively to the intermediate frequency of the sound television signal and to that of the sound of the broadcast waves, as fed by the anode *a*–1.

The second transformer T–2, the primary of which is inserted in the circuit of the anode *a*–1 is tuned to a frequency of 473 kilocycles and may be short-circuited by a wireless and television switch RV which serves also for the short-circuiting of the transformer T–1 in its position transmitting wireless signals. Thus the switch RV is adapted to short circuit selectively one of the transformers T–1 and T–2 so that the set may operate selectively as a broadcasting radio or television receiver.

The anode *a*–2 or the grid *g*–3 of the triode L–2 attached to the oscillator coil B is connected through a coupling condenser *c* with a control grid *g*–4 of a buffer tube L–4 which is separate from the tubes L–1 and L–2. Said buffer tube L–4 is constituted by the association of two triodes and it includes a first group of triode electrodes *c*–4—*g*–4—*a*–4, the anode *a*–4 of which is coupled through a condenser *cp* with the modulating grid *g*–5 forming part of the second group of triode electrodes acting as a mixer. The grid $g$–5 is fed furthermore by the television signals amplified in the high frequency stages the last stage of which includes the tuning circuit *av*. These television signals are produced by the high frequency system shown diagrammatically at M, while the high frequency radio signals are furnished by means shown diagrammatically at N.

The anode $a$–5 of the second group of triode electrodes $g$–5—$a$–5 is connected with a high voltage supply HT through a circuit RLC tuned to the intermediate frequency intended for television purposes and produced by the change of frequency performed inside the modulating triode $g$–5—$a$–5. This intermediate frequency also contains the sound components of the television signals and consequently there is provided a low impedance coupling line K including at one end a few turns S$p$ coupled magnetically with the winding L in the circuit RLC, while the other end of the coupling line K includes a few coupling turns S$r$ which serve for the injection into the secondary of the transformer T–1 of the sound components of the television signals tapped off through said turns S$p$. If the audio and video signals of the television transmission are not separated upon reception, the audio signals are transmitted to the tube L–3 through said auxiliary circuit S$p$—S$r$ and the secondary of the transformer T–1.

The anode circuit passing through the anode $a$–5 of the frequency changing triode is coupled with the intermediate frequency stages MF—TV of the television signals.

Figure 2:
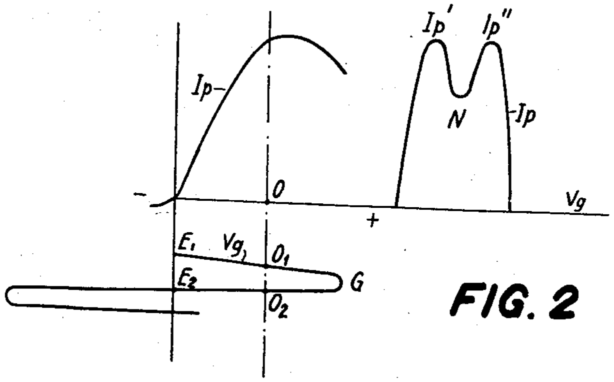
Fig. 2 is a graph relating to the doubling of the fundamental frequency.

The doubling of the frequency of the fundamental waves produced by the local oscillating tube L–2 is obtained in accordance with a conventional procedure by the first triode $c$–4—$g$–4—$a$–4. The latter forms a class B amplifying triode operating through a biasing of the cathode and a supplementary grid current bringing the tube to cut-off conditions for a predetermined value of the anode voltage. Consequently, the anode current I$p$ shows two peaks respectively at I′$p$ and I″$p$, said peaks being separated by a depression N, for each period of the alternating grid voltage V$g$. The frequency of the fundamental waves corresponding to V$g$ is thus doubled in the anode current I$p$ (Fig. 2).

The buffer tube L–4 which allows the passage therethrough of the fundamental frequency produces a frequency which is double that of the fundamental frequency at a level higher than that of the harmonic 2 of the fundamental oscillation considered alone. It is thus possible to bring said harmonic through suitable biasing steps to the desired level for its rational use in a combined wireless and television set designed for the reception of numerous frequency ranges or bands.

On the other hand, the incorporation of this separate buffer stage, which cuts out the parasitical reactions between the local oscillations and the incoming signals removes any risk of a shifting of the frequency inside the frequency range to be received.

Figure 3:
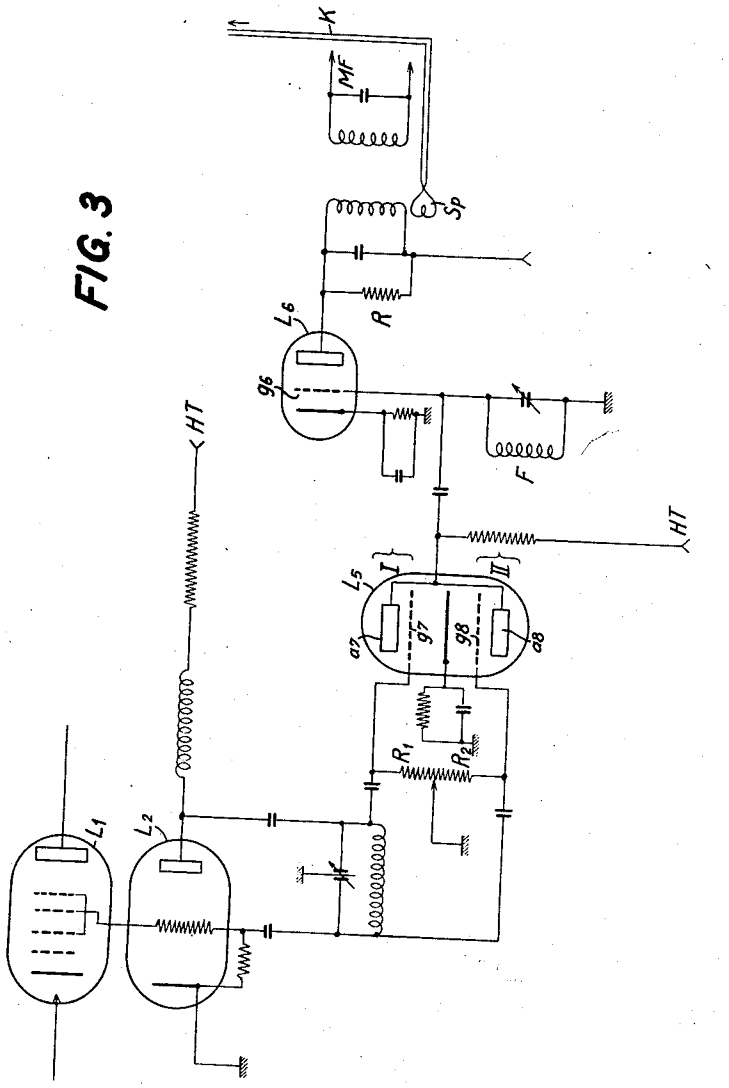
Fig. 3 is a wiring diagram of a second embodiment of an arrangement according to my invention.

In the second embodiment illustrated in Fig. 3, I resort to a conventional frequency doubler including two grid-anode groups I–II mounted in phase opposition conditions inside a common buffer tube L–5. I produce inside said frequency doubling tube a predetermined want of balance so as to obtain a high yield for the fundamental wave. This want of balance is produced by means of a voltage divider R–1—R–2 connecting the grids $g$–7—$g$–8 and adapted to make R–1 different from R–2. The triode L–6, the grid $g$–6 of which is coupled with the anode system $a$–7—$a$–6 of the tube L–5 serves as a modulator in the manner disclosed for the second triode $g$–5—$a$–5 in the arrangement illustrated in Fig. 1.

What I claim is:

1. In a combined wireless radio and television set the provision of a high frequency radio amplifying chain, at least one oscillating and modulating tube fed by said chain including a cathode, a modulating grid and an anode, a local oscillation-producing tube energizing said modulating grid and including an anode, at least one buffer system including a first group of electrodes constituted by a cathode, an anode and a grid fed by the oscillations of the oscillation-producing tube, said first group of electrodes being adapted to double the frequency of the local oscillations, and a second group of electrodes constituted by a cathode, an anode and a control grid coupled with the anode of the first group, a high frequency television amplifying chain feeding the control grid of the second group of electrodes in the buffer system to mix the television signals with the doubled local oscillations, and an intermediate television frequency chain fed by the anode of said second group.

2. In a combined wireless radio and television set, the provision of a high frequency radio amplifying chain, at least one oscillating and modulating tube fed by said chain including a cathode, a modulating grid and an anode, a local oscillation-producing tube energizing said modulating grid and including an anode, at least one buffer system including a double tube adapted to double the local frequency and having a cathode, two grids inserted in phase opposition to either side of the cathode and fed by the oscillations of the oscillation-producing tube, and two anodes associated with said grids an adjustable voltage divider connecting the said grids of the double tube and adapted to modify the balance of the double tube, a further tube having a grid connected with both anodes of the double tube and an anode, a high frequency television amplifying chain feeding the control grid in said further tube to mix the television signals with the doubled local oscillations, and an intermediate television frequency chain fed by the anode of said further tube.

3. In a combined wireless radio and television set, the provision of a high frequency radio amplifying chain, at least one oscillating and modulating tube fed by said chain including a cathode, a modulating grid and an anode, a local oscillation-producing tube energizing said modulating grid and including an anode, transformers connected with the anode of the oscillating and modulating tube, a common intermediate frequency chain for the wireless radio and television sound signals fed by said transformers, at least one buffer system including a first group of electrodes constituted by a cathode, an anode and a grid fed by the oscillations of the oscillation-producing tube, said first group of electrodes being adapted to double the frequency of the local oscillations, and a second group of electrodes constituted by a cathode, an anode and a control grid coupled with the anode of the first group, a high frequency television amplifying chain feeding the control grid of the second group of electrodes in the buffer system to mix the television signals with the doubled local oscillations, an intermediate television frequency chain fed by the anode of said second group, at least one turn fed by the anode of the second group of electrodes adapted to collect the intermediate frequency television sound components, a low impedance coupling line connected with said turns and coupled with one of the transformers to reinject the television sound signals into the said common intermediate frequency chain.

4. In a combined wireless radio and television set, the provision of a high frequency radio amplifying chain, at least one oscillating and modulating tube fed by said chain and including a cathode, a modulating grid and an anode, a local oscillation-producing tube energizing said modulating grid and including an anode, transformers connected with the anode of the oscillating and modulating tube, a common intermediate frequency chain for the wireless radio and television sound signals fed by said transformers, a double tube adapted to double the local frequency and including a cathode, two grids inserted in phase opposition to either side of the cathode and fed by the oscillations of the oscillation-producing tube, and two anodes associated with said grids, an adjustable voltage divider connecting the grids of said double tube and adapted to modify the balance of the double tube, a further tube having a grid connected with both anodes of the double tube and an anode, a high frequency television amplifying chain feeding the control grid of said further tube to mix the television signals with the doubled local oscillations, an intermediate television frequency chain fed by the anode of said further tube, and at least one convolution fed by the anode of the last mentioned tube adapted to collect the intermediate frequency television sound components, and a low impedance coupling line connected with said convolutions and coupled with one of the transformers to reinject the television sound signals into the said common intermediate frequency chain.

5. In a combined wireless radio and television set of the frequency band type, the combination of an oscillating and modulating tube, means for feeding said tube with the incoming amplified high frequency signals, a local oscillator including a grid connected with the tube to produce the intermediate radio frequency, an independent aperiodic buffer tube system fed with the output of the local oscillator including a first electrode group adapted to operate as a frequency doubler and a second electrode group adapted to be fed with the incoming television signals and to mix them with the multiplied frequency waves from the first mentioned group to produce the intermediate television frequency an intermediate television frequency circuit fed thereby and circuits tuned to predetermined intermediate audio signal frequencies and fed with the output of the oscillating and modulating tube.

6. In a combined wireless radio and television set of the frequency band type, the combination of an oscillating and modulating tube, means for feeding said tube with the incoming amplified high frequency signals, a local oscillator including a grid connected with the tube to produce the intermediate radio frequency, an independent buffer tube including in sequence a first cathode, a first grid fed by the output of the local oscillator, a first anode, a second cathode connected with the first cathode, a second grid, a condenser coupling between the second grid and the first anode and a second anode, the first cathode, grid and anode system operating as a frequency doubler, means feeding high frequency television signals to the second grid to mix the said television signals with the doubled local oscillator frequency, an intermediate television frequency circuit fed by said second anode and circuits tuned to predetermined intermediate audio signal frequencies and fed with the output of the oscillating and modulating tube.

7. In a combined wireless radio and television set of the frequency band type, the combination of an oscillating and modulating tube, means for feeding said tube with the incoming amplified high frequency signals, a local oscillator including a grid connected with the tube to produce the intermediate radio frequency, an independent aperiodic buffer tube system fed with the output of the local oscillator including a first electrode group adapted to operate as a frequency doubler and a second electrode group adapted to be fed with the incoming television signals and to mix them with the multiplied frequency waves from the first mentioned group to produce the intermediate television frequency, an intermediate television frequency circuit fed thereby, circuits tuned to predetermined intermediate audio signal frequencies and fed with the output of the oscillating and modulating tube and a circuit including coils coupled respectively with one of the last mentioned circuits and with the intermediate television frequency circuit.

8. In a combined wireless radio and television set of the frequency band type, the combination of an oscillating and modulating tube, means for feeding said tube with the incoming amplified high frequency signals, a local oscillator including a grid connected with the tube to produce the intermediate radio frequency, an independent buffer tube including in sequence a first cathode, a first grid fed by the output of the local oscillator, a first anode, a second cathode connected with the first cathode, a second grid, a condenser coupling between the second grid and the first anode and a second anode, the first cathode, grid and anode system operating as a frequency doubler, means feeding high frequency television signals to the second grid to mix the said television signals with the doubled local oscillator frequency, an intermediate television frequency circuit fed by said second anode, circuits tuned to predetermined intermediate audio signal frequencies and fed with the output of the oscillating and modulating tube and a circuit including coils coupled respectively with one of last mentioned circuits and with the intermediate television frequency circuit.

References Cited in the file of this patent

UNITED STATES PATENTS

| | | |
|---|---|---|
| 1,848,507 | Vos et al. | Mar. 8, 1932 |
| 2,166,538 | Shore | July 18, 1939 |
| 2,263,634 | Landon | Nov. 25, 1941 |
| 2,414,460 | Frink | Jan. 21, 1947 |
| 2,596,117 | Bell et al. | May 13, 1952 |